(12) United States Patent
Bell et al.

(10) Patent No.: US 7,285,021 B2
(45) Date of Patent: *Oct. 23, 2007

(54) DOCKING CABLE

(75) Inventors: Jory Bell, San Francisco, CA (US); Jonathan Betts-LaCroix, Chatsworth, CA (US); Mindy Ward, San Francisco, CA (US); Vance Chin, San Francisco, CA (US)

(73) Assignee: OQO, Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 11/049,767

(22) Filed: Feb. 3, 2005

(65) Prior Publication Data

US 2005/0245115 A1 Nov. 3, 2005

Related U.S. Application Data

(60) Provisional application No. 60/541,961, filed on Feb. 4, 2004.

(51) Int. Cl.
*H01R 9/11* (2006.01)
(52) U.S. Cl. .................. 439/623; 439/505; 439/638
(58) Field of Classification Search ............ 439/502, 439/623, 505, 498, 638, 639
See application file for complete search history.

(56) References Cited

U.S. PATENT DOCUMENTS

| | | | | |
|---|---|---|---|---|
| 4,588,187 A | | 5/1986 | Dell | |
| 4,648,682 A | * | 3/1987 | Tubbs | 439/391 |
| 4,783,846 A | * | 11/1988 | Wachob | 455/151.4 |
| 5,044,961 A | * | 9/1991 | Bruskewitz | 439/67 |
| 5,044,964 A | * | 9/1991 | Minerd et al. | 439/67 |
| 5,053,583 A | * | 10/1991 | Miller et al. | 174/36 |
| 5,187,645 A | | 2/1993 | Spalding et al. | |
| 5,192,226 A | | 3/1993 | Wang | |
| 5,234,360 A | * | 8/1993 | Kramer, Jr. | 439/505 |
| 5,463,742 A | | 10/1995 | Kobayashi | |
| 5,590,022 A | | 12/1996 | Harvey | |
| 5,689,654 A | | 11/1997 | Kikinis et al. | |

(Continued)

FOREIGN PATENT DOCUMENTS

JP 21015945 A2 1/2001

(Continued)

OTHER PUBLICATIONS http://www.ymouse.com Jul. 2000 P.I. Engineering Y-see two Dual Monitor Adapter (WHYM-0006).*

(Continued)

*Primary Examiner*—Tho D. Ta
*Assistant Examiner*—Vanessa Girardi
(74) *Attorney, Agent, or Firm*—Robert Plotkin, P.C.

(57) ABSTRACT

A cable is disclosed which include a first connector, a second connector, a primary flexible cable segment coupled to the first connector at a first location on the primary flexible cable segment and to the second connector at a second location on the primary flexible cable segment, and a third connector coupled to the primary flexible cable segment at a third location between the first and second locations on the primary flexible cable segment.

16 Claims, 11 Drawing Sheets

U.S. PATENT DOCUMENTS

| | | | |
|---|---|---|---|
| 5,982,614 A | 11/1999 | Reid | |
| 6,029,215 A | 2/2000 | Watts, Jr. et al. | |
| 6,072,695 A | 6/2000 | Steiger et al. | |
| 6,163,326 A | 12/2000 | Klein et al. | |
| 6,170,026 B1 | 1/2001 | Kimura et al. | |
| 6,231,371 B1 | 5/2001 | Helot | |
| 6,243,727 B1 | 6/2001 | Watts, Jr. | |
| 6,291,770 B1 * | 9/2001 | Casperson | 174/72 A |
| 6,292,371 B1 * | 9/2001 | Toner, Jr. | 361/752 |
| 6,297,953 B1 | 10/2001 | Helot | |
| 6,309,230 B2 | 10/2001 | Helot | |
| 6,324,606 B1 | 11/2001 | Lenehan et al. | |
| 6,361,357 B1 * | 3/2002 | Stillwell et al. | 439/490 |
| 6,364,697 B1 | 4/2002 | Tseng et al. | |
| 6,407,914 B1 | 6/2002 | Helot | |
| 6,427,914 B1 | 8/2002 | Snyder | |
| 6,456,492 B1 | 9/2002 | Wang et al. | |
| 6,489,932 B1 | 12/2002 | Chitturi et al. | |
| 6,746,273 B1 * | 6/2004 | Liu et al. | 439/502 |
| 6,833,989 B2 * | 12/2004 | Helot et al. | 361/686 |
| 2001/0001083 A1 | 5/2001 | Helot | |
| 2001/0042150 A1 | 11/2001 | Moroz et al. | |
| 2002/0008959 A1 | 1/2002 | Helot | |
| 2002/0086703 A1 | 7/2002 | Dimenstein et al. | |
| 2004/0062496 A1 * | 4/2004 | Shuman et al. | 385/101 |

FOREIGN PATENT DOCUMENTS

| | | |
|---|---|---|
| WO | WO 98/25352 A2 | 6/1998 |
| WO | WO 98/29796 A1 | 7/1998 |

OTHER PUBLICATIONS http://www.dspglobal.com/adaptors.htm © 2003 DSP Global pp. 1-7.* http://www.petsprojects.com/stero-video/index.htm © 2003 by Peter Vickers 6 Display Adapters 6.1.2 VGA Adapter Module 6.1.3 VGA Adapter Circuit Board.*

* cited by examiner

DOCKING CABLE

CROSS REFERENCE TO RELATED APPLICATIONS

This application claims priority from commonly-owned U.S. Provisional Patent App. Ser. No. 60/541,961, entitled "Docking Cable," filed on Feb. 4, 2004.

This application is related to U.S. patent application Ser. No. 10/173,734, filed on Jun. 18, 2002, entitled "Modular Computing System," which is hereby incorporated by reference.

BACKGROUND

1. Field of the Invention

The present invention relates to cables for use in computer systems and other electronic devices.

2. Related Art

Various kinds of input/output (I/O) cables are used to connect computing devices and peripheral devices to each other. For example, referring to FIG. 1A, a prior art I/O adapter cable is shown which connects to a first connector 102a on a computing device and to a second connector 102b on a peripheral device. Because the connectors 102a-b may differ from each other, one purpose of the I/O adapter cable 100a is to adapt signals from the computer connector 102 a to the peripheral connector 102b.

Referring to FIG. 1B, a first prior art port expander cable 100b is shown which breaks out signals in a multifunction connector 104a on a computing device to individual device connectors 104b-d at the ends of multiple cables 106a-c, each of which may be connected to a distinct peripheral device.

Referring to FIG. 1C, a second prior art port expander cable 100c is shown which connects at a first multifunction connector 108a on a computing device and to individual device connectors 108b-d at the ends of multiple cables 110a-c, each of which may be connected to a distinct peripheral device. A single cable 110d, which is connected to connector 108a, breaks into individual cables 110a-c.

Referring to FIG. 1D, a third prior art port expander cable 100d is shown which connects at a first multifunction connector 112a on a computing device. Cable 114 is connected on one end to connector 112 a and on the other end to a rigid multi-connector module 116. Module 116 includes connectors 118a-c, each of which may be connected to a distinct peripheral device.

SUMMARY

A cable is disclosed which includes a first connector, a second connector, a primary flexible cable segment coupled to the first connector at a first location on the primary flexible cable segment and to the second connector at a second location on the primary flexible cable segment, and a third connector coupled to the primary flexible cable segment at a third location between the first and second locations on the primary flexible cable segment. The cable may, for example, be suitable for connecting a computing device (coupled to the first connector) to a plurality of peripheral devices (coupled to the second and third connectors). The second and third connectors may, for example, be of different types for connecting to different types of peripheral devices.

DETAILED DESCRIPTION

In one aspect of the present invention, a cable is provided for connecting a first device (such as a computing device) to a plurality of second devices (such as a plurality of peripheral devices). The cable includes a primary connector for connecting to the first device and a plurality of secondary connectors for connecting to the plurality of second devices. The cable is connected at one end to the primary connector and at the other end to a first one of the secondary connectors. The remaining secondary connectors are coupled flexibly to the cable at positions between the primary connector and the first one of the secondary connectors. Among the advantages of embodiments of the cable is that the flexibility of the connections between the connectors makes the cable easy to fold, store, and transport. Embodiments of the present invention will now be described in more detail.

Figure 1A:
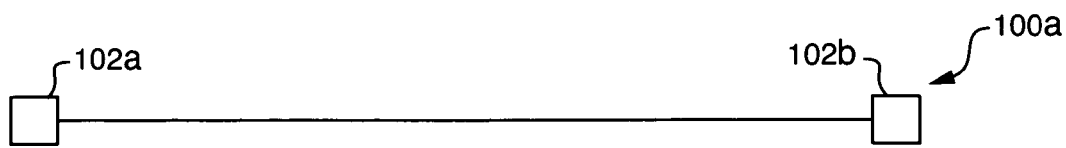
FIGS. 1A-1D are diagrams of prior art I/O cable configurations.
Figure 1B:
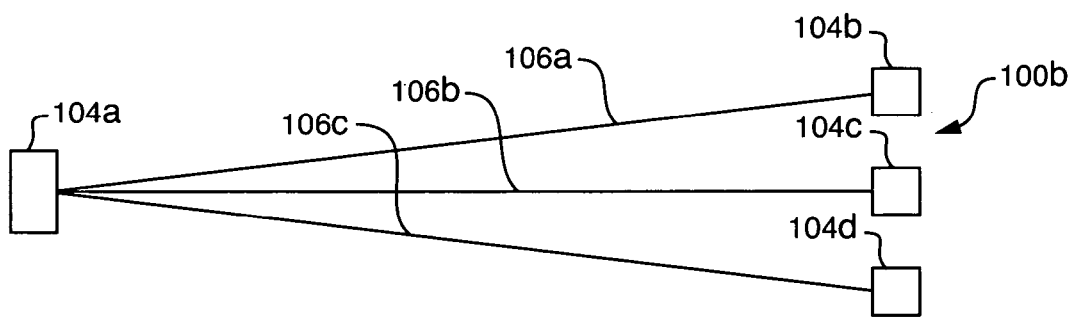
Figure 1C:
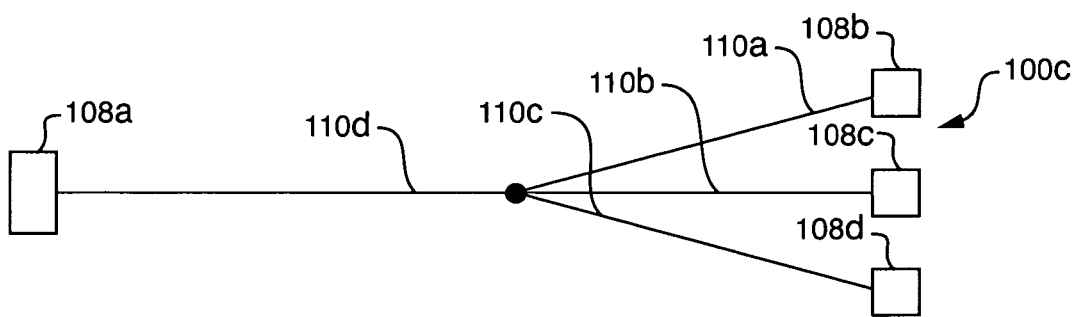
Figure 1D:
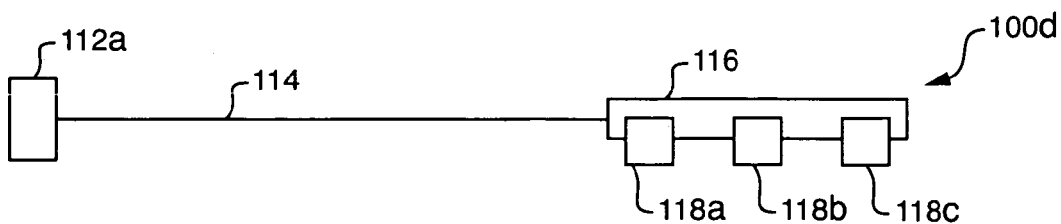
Figure 1E:
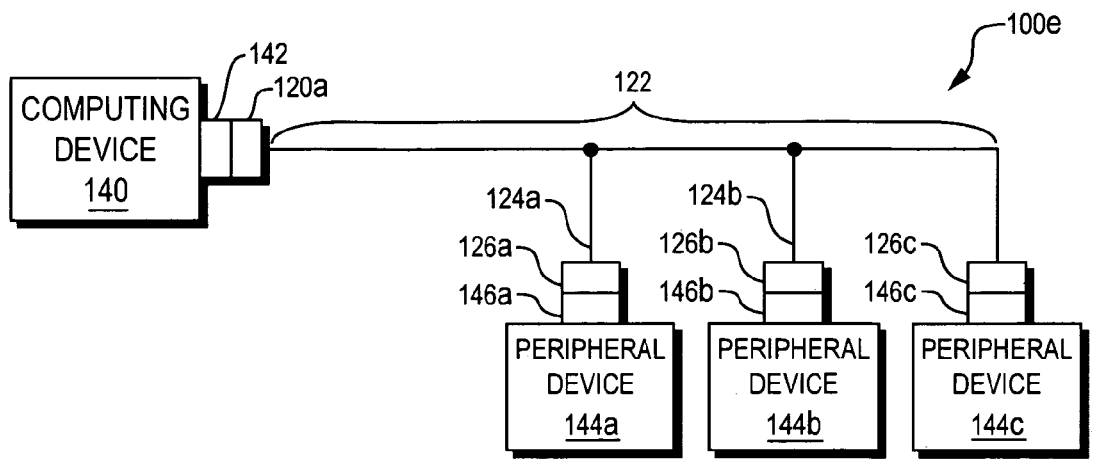
FIGS. 1E-1F are diagrams of cable configurations according to embodiments of the present invention.

Referring to FIG. 1E, a diagram is shown of a cable 100e according to one embodiment of the present invention. Cable 100e includes a primary cable segment 122, which connects at a first multifunction connector 120a to a port 142 of a computing device 140, such as a handheld computer. Cable segment 122 is connected on one end to connector 120a. Cable 100e also includes connectors 126a-b, which are connected to cable segment 122 by individual secondary cable segments 124a-b, respectively. The secondary cable segments 124a-b are coupled to the primary cable segment 122 at successive positions along the cable segment 122.

Cable 100e also includes a connector 126c at the end of the primary cable segment 122. As described in more detail below with respect to FIG. 2A, connector 126c terminates the cable 100e. In the embodiment illustrated in FIG. 1E, therefore, the connector 126c is not connected to the primary cable segment 122 using a secondary cable segment.

Cable segment 122 breaks out the signals in the multifunction connector 120a to the individual connectors 126a-c, respectively. Connectors 126a-c may be coupled to ports 146a-c of peripheral devices 144a-c, respectively.

Figure 1F:
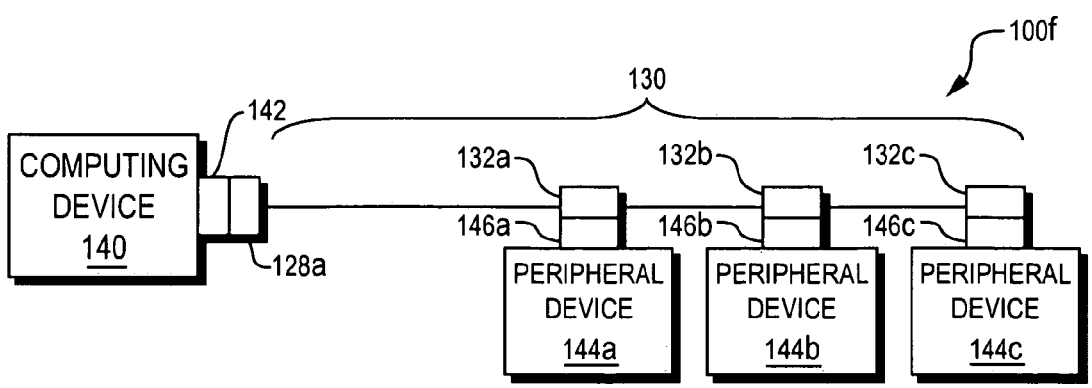

Referring to FIG. 1F, a diagram is shown of a cable 100f according to another embodiment of the present invention. Cable 100f includes a primary cable segment 130, which connects at a first multifunction connector 128a on computing device 140. Primary cable segment 130 is connected on one end to connector 128a. Cable 100f also includes connectors 132a-c, which are serially distributed along the primary cable segment 130. The signals in the multifunction connector 128a are broken out to the individual connectors 132a-c. Connectors 132a-c may be coupled to ports 146a-c of peripheral devices 144a-c, respectively.

The cables 100e and 100f illustrated in FIGS. 1E and 1F, respectively, may be used to expand the I/O capabilities of the computing device 140 or other device, and may be classified, for example, as docking stations, port expanders, or a combination thereof.

Figure 2A:
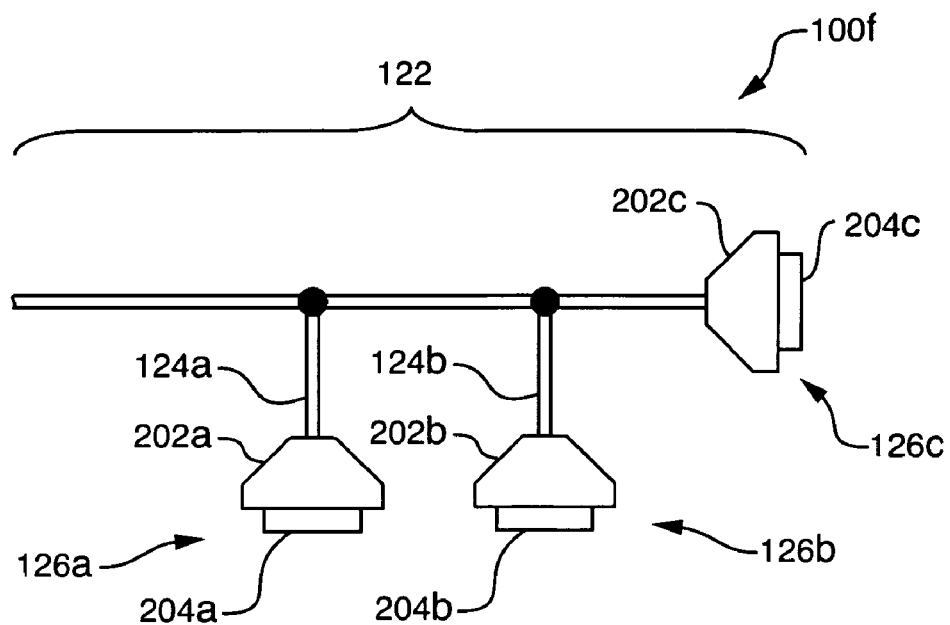
FIGS. 2A-2B are diagrams illustrating termination details of cables implemented according to embodiments of the present invention.
Figure 2B:
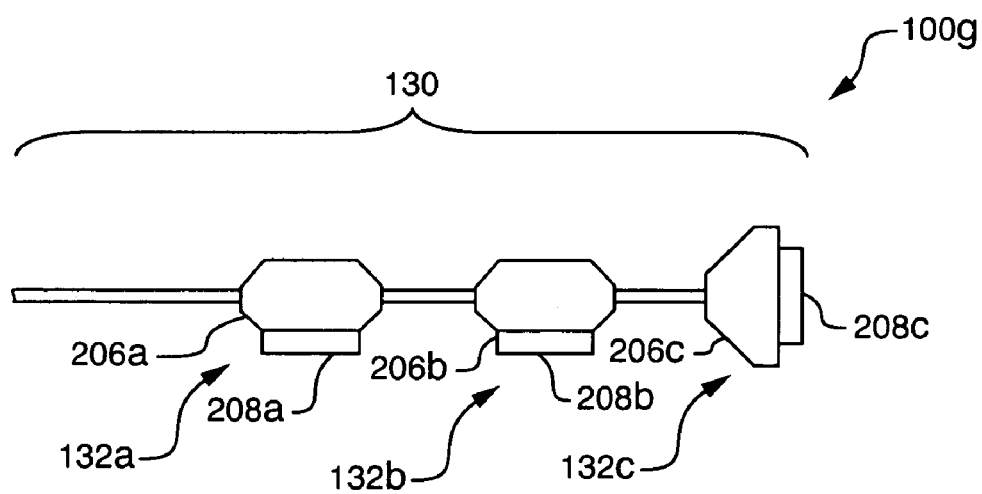

Referring to FIGS. 2A-2B, a diagram is shown which illustrates termination details of the cables 100e-f (FIGS. 1E-1F) according to one embodiment of the present invention. Referring to FIG. 2A, connectors 126a-c include flexible over-molds 202a-c and rigid (typically metal) connector bodies 204a-c, respectively. Note that primary cable segment 122 and secondary cable segments 124a-b are flexible even if connectors 126a-c are rigid or semi-rigid.

Referring to FIG. 2B, connectors 132a-c include flexible over-molds 206a-c and rigid (typically metal) connector bodies 208a-c, respectively. Note that primary cable segment 130 is flexible even if connectors 128a and 132a-c are rigid.

Figure 3A:
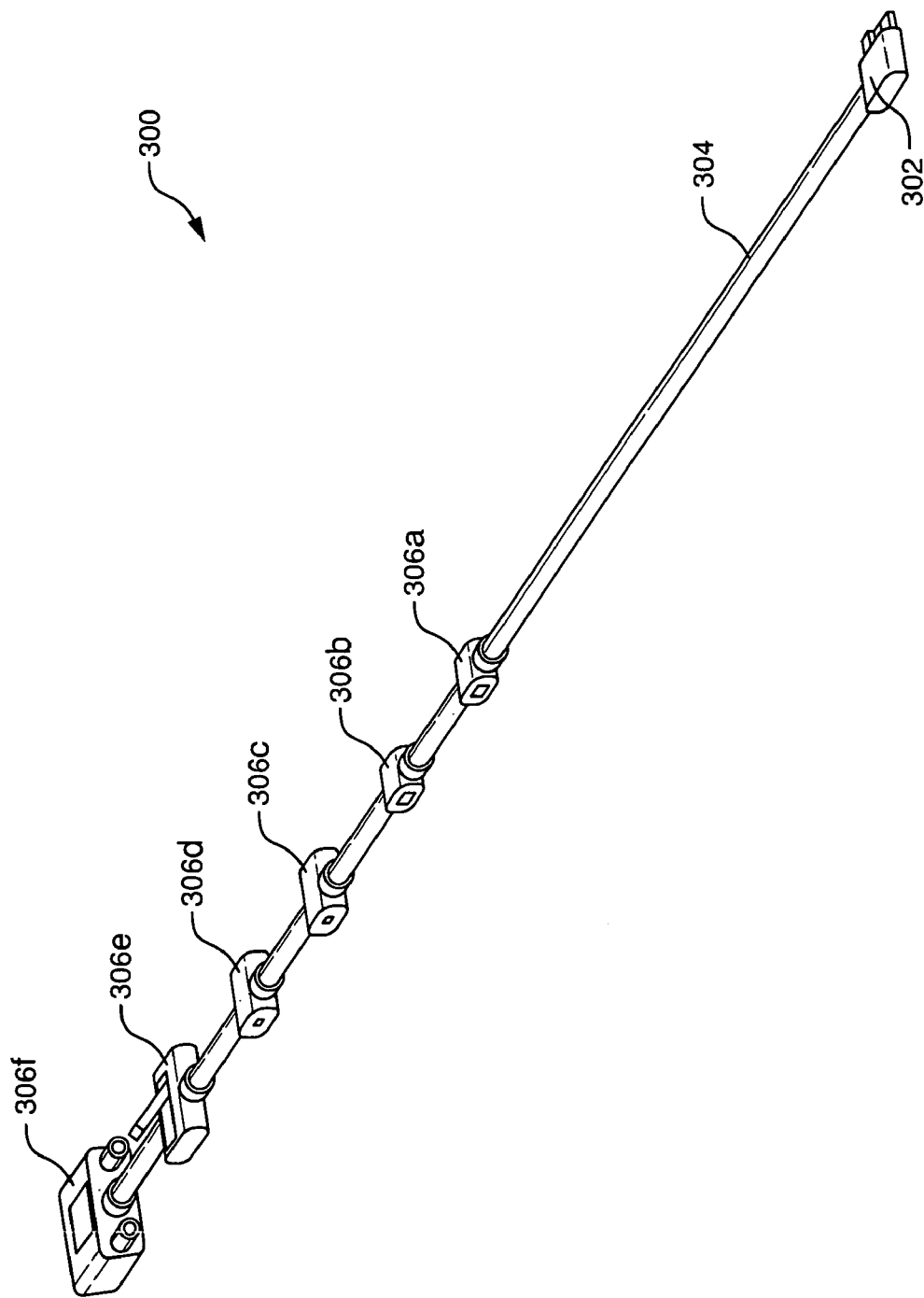
FIGS. 3A-3C are perspective views of cables implemented in accordance with embodiments of the present invention.
Figure 3B:
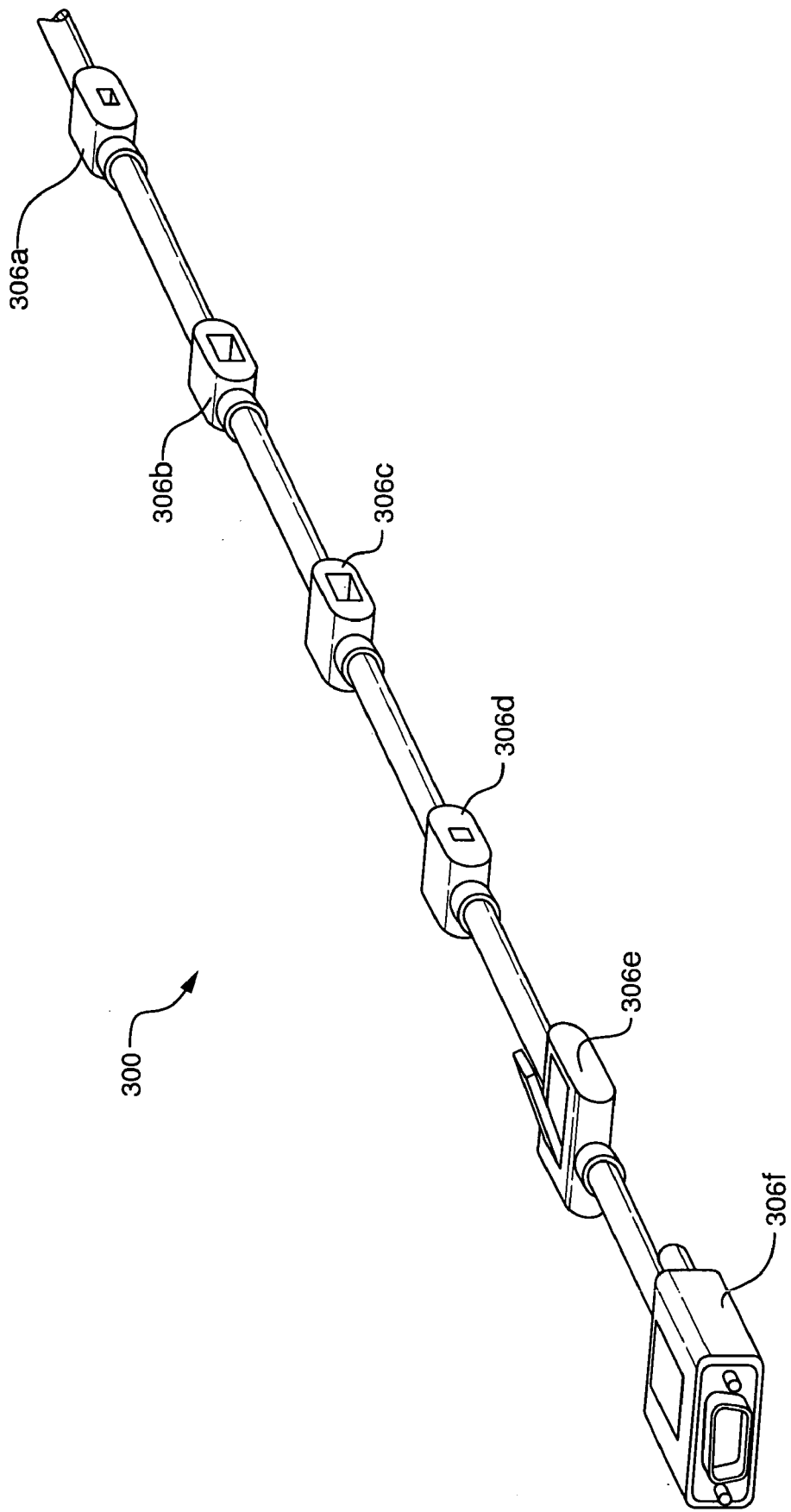
Figure 3C:
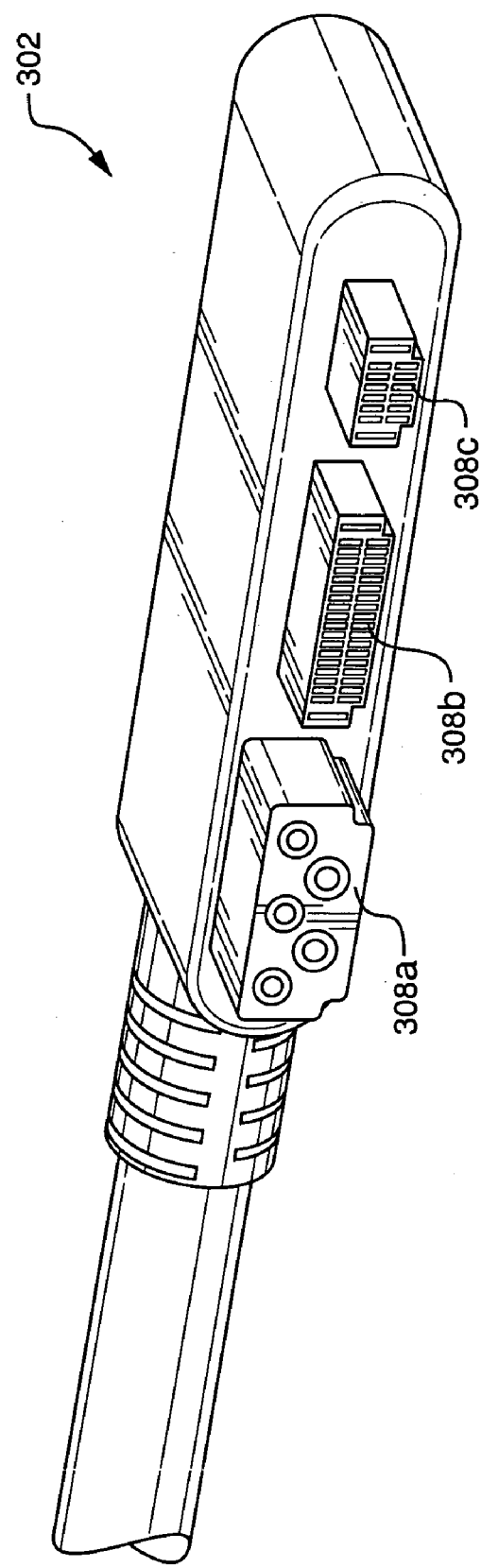

Referring to FIGS. 3A-3C, perspective views are shown of a cable 300 of the type shown in FIG. 1F according to one embodiment of the present invention. The cable 300 includes a primary cable segment 304 that runs the length of the cable 300. At one end of the cable segment 304 is a primary connector 302. As will be described in more detail below, the primary connector 302 is suitable for connection to a computing device.

The cable 300 also includes a plurality of secondary connectors 306a-f connected in series along the primary cable segment 304. As will be described in more detail below, the secondary connectors 306a-f are suitable for connecting to a plurality of peripheral devices. In the embodiment shown in FIG. 3A, connector 306a is a FireWire® (IEEE 1394) connector, connector 306b is a DC power in connector, connector 306c is a Universal Serial Bus (USB) connector, connector 306d is an audio out connector, connector 306e is an Ethernet connector, and connector 306f is a VGA out connector.

FIG. 3C shows the primary connector 302 in more detail. In the embodiment illustrated in FIG. 3C, connector 302 includes three connectors 308a-c: a DC power connector 308a, a 36-pin docking connector 308b, and a 14-pin docking connector 308c.

Figure 4:
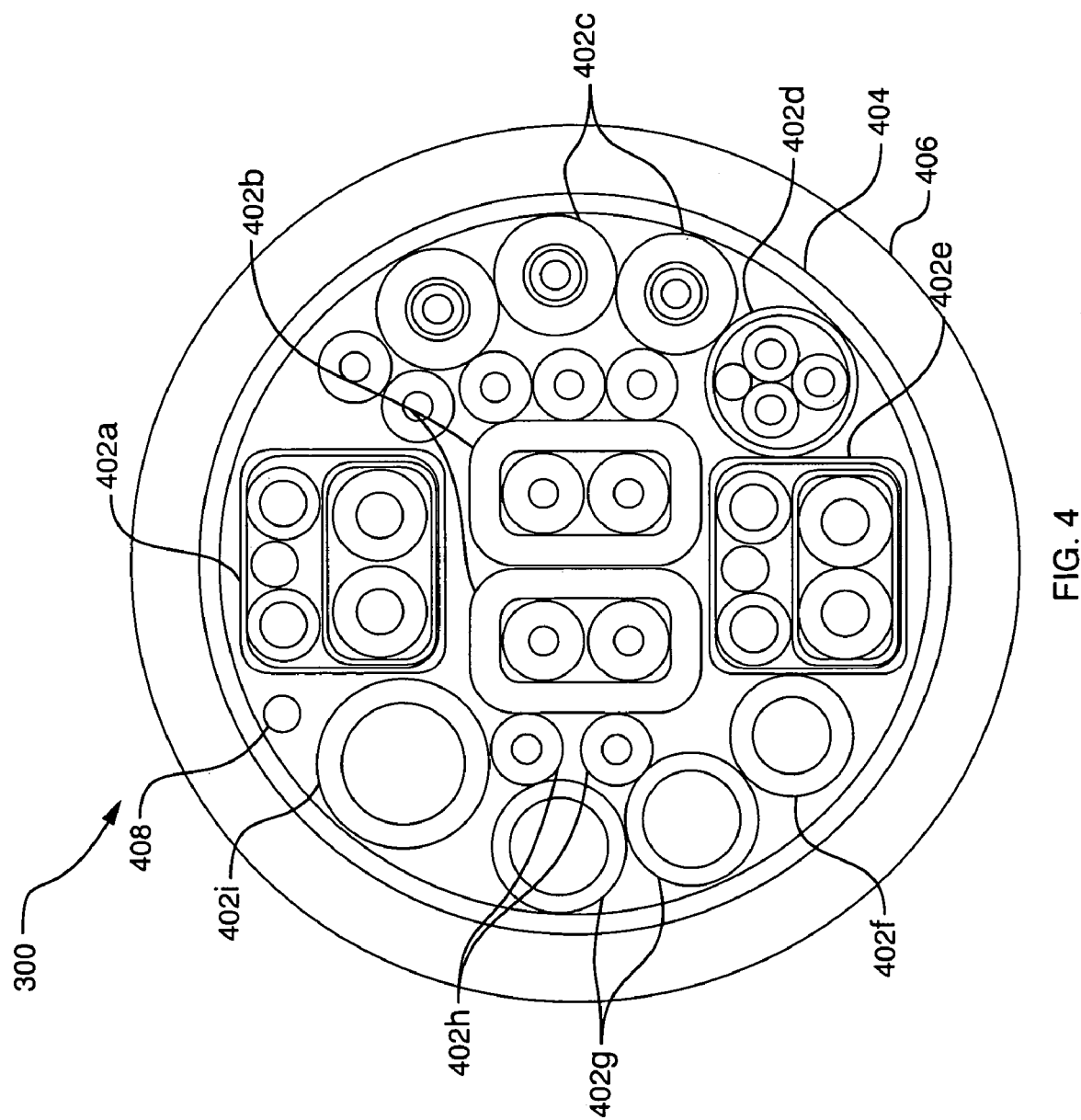
FIG. 4 is a cross-sectional view of a cable according to one embodiment of the present invention.

Referring to FIG. 4, a cross-sectional view is shown of the cable 300 according to one embodiment of the present invention. As shown in FIG. 4, the cable 300 includes:

USB wiring 402a for connecting to the Ethernet connector 306e;
wiring 402b for the FireWire® connector 306a;
wiring 402c for the VGA out connector 306f;
wiring 402d for the audio out connector 306d;
wiring 402e for the USB connector 306c;
wiring 402f-i for the DC power in connector 306b, including a power charge wire 402f for charging a connected computing device, a power ground wire 402g, a power sense wire 402h, and a system power wire 402i for providing power to a connected computing device; and
a drain wire 408 that runs the length of the cable 300 and connects to the outer shield of each of the connectors 306a-f.

The cable 300 is enclosed in aluminum tape 404 and a PVC outer shielding 406. Note that in the particular embodiment illustrated in FIG. 4, USB wiring 402a is used to carry signals to and from the Ethernet connector 306e. The Ethernet connector 306e may, therefore, including appropriate circuitry and/or other means for converting USB signals into Ethernet signals and vice versa. The use of USB wiring 402 to carry signals to and from the Ethernet connector 306e is shown merely as an example and does not constitute a limitation of the present invention.

Figure 5A:
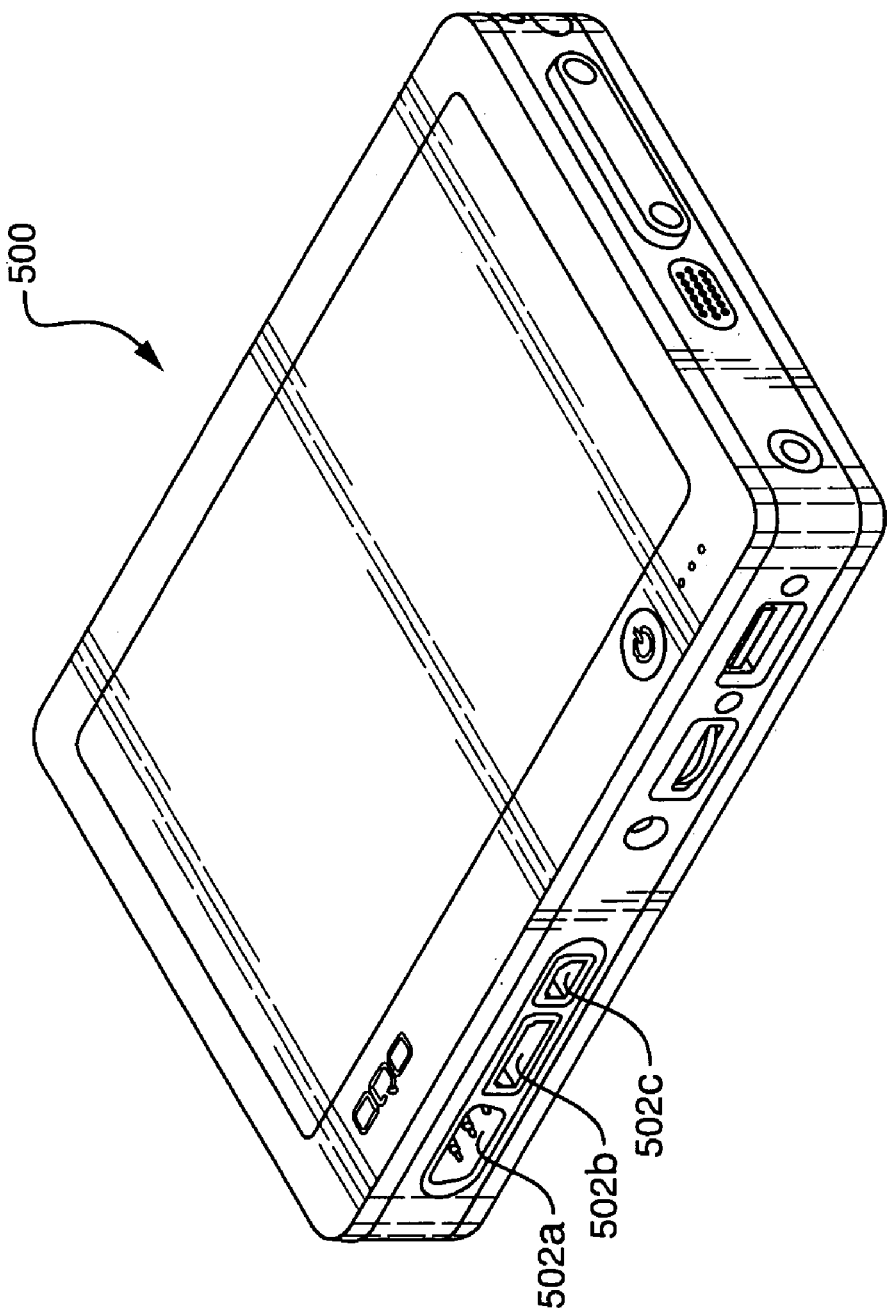
FIGS. 5A-5C are illustrations of computer systems including cables implemented according to embodiments of the present invention.
Figure 5B:
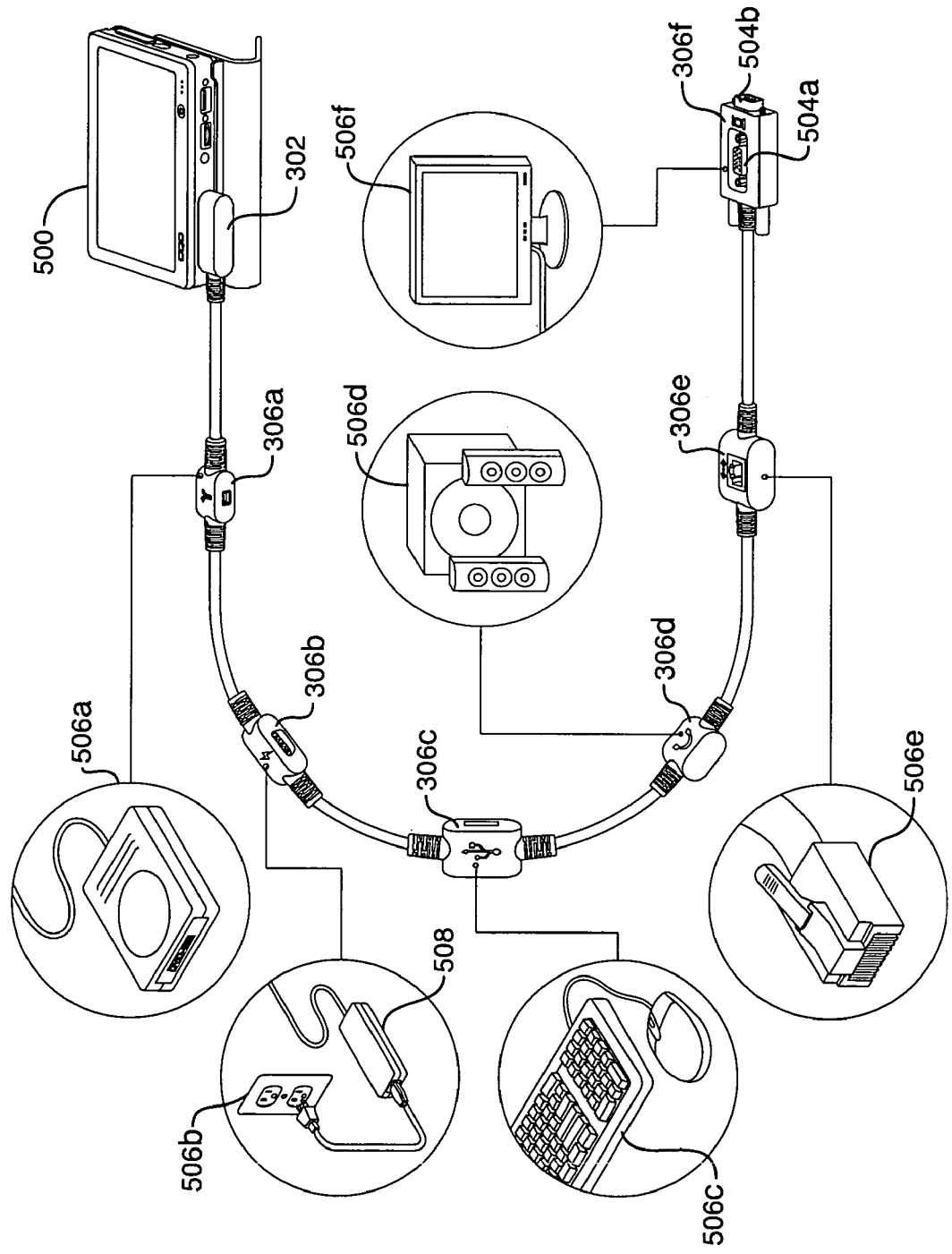
Figure 5C:
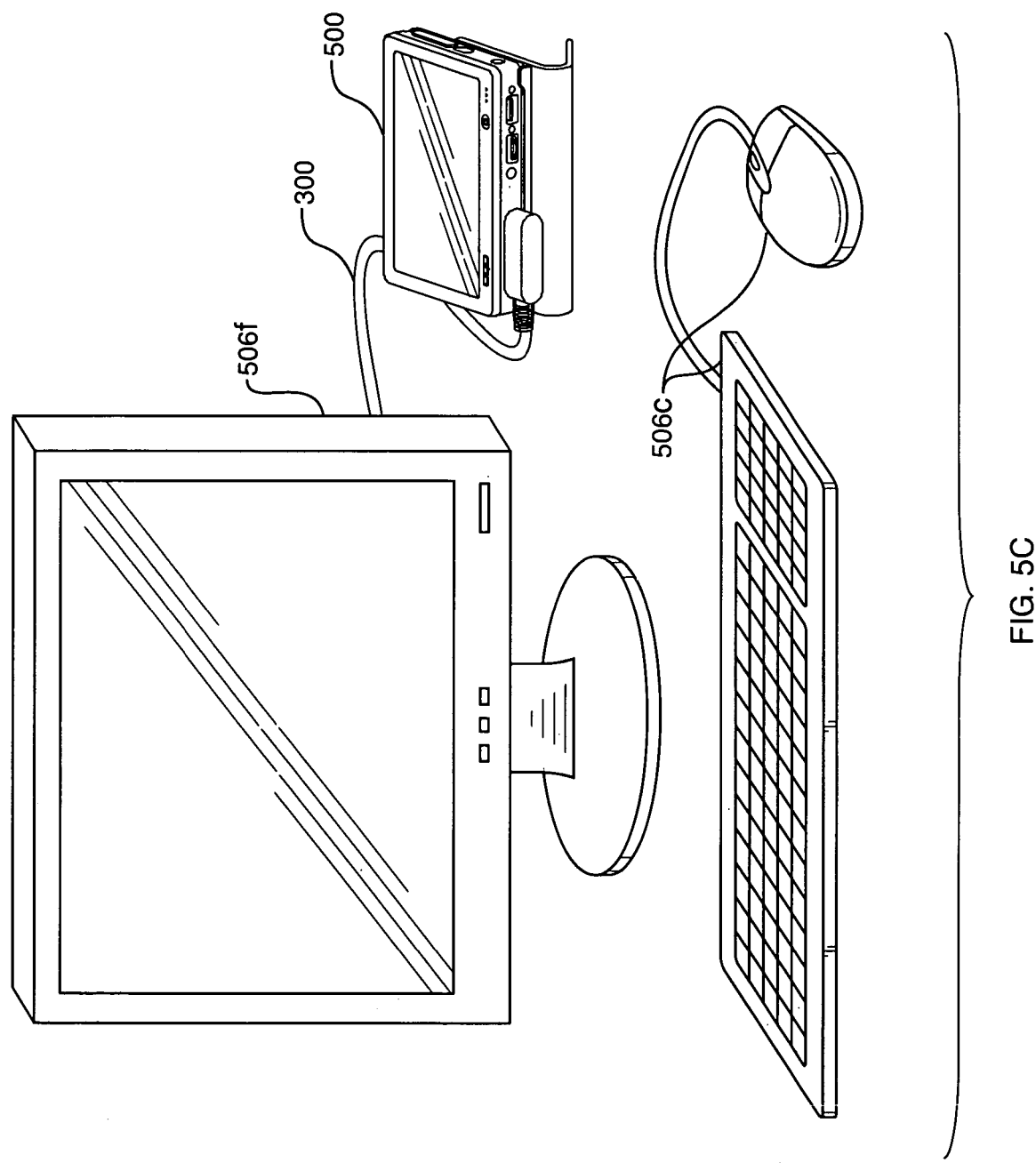

Referring to FIGS. 5A-5C, examples are shown of the cable 300 in use to connect a computing device to a variety of peripheral devices. For example, referring to FIG. 5A, an example of a computing device 500 is shown. The computing device 500 may, for example, be of the kind disclosed in the above-referenced patent application entitled "Modular Computing System." The computing device 500 includes ports 502a-c for connecting to the connectors 308a, 308b, and 308c, respectively, on connector 302 of the cable.

Referring to FIG. 5B, an example is shown in which the cable 300 connects the computing device 500 to a power source, network connector, and a plurality of peripheral devices. More specifically, primary connector 302 of cable 300 is coupled to connectors 502a, 502b, and 502c of computing device 500. FireWire® connector 306a is coupled to a FireWire® port (not shown) of an external DVD-RW drive 506a. Power connector 306b is coupled to an AC power supply 506b through a transformer 508. USB connector 306c is coupled to a keyboard and mouse 506c. Audio out connector 306d is coupled to a set of speakers 506d. Female Ethernet connector 306e is coupled to a male Ethernet connector 506e, which may in turn be coupled to an appropriate network device (such as a router or cable modem).

Figure 3D:
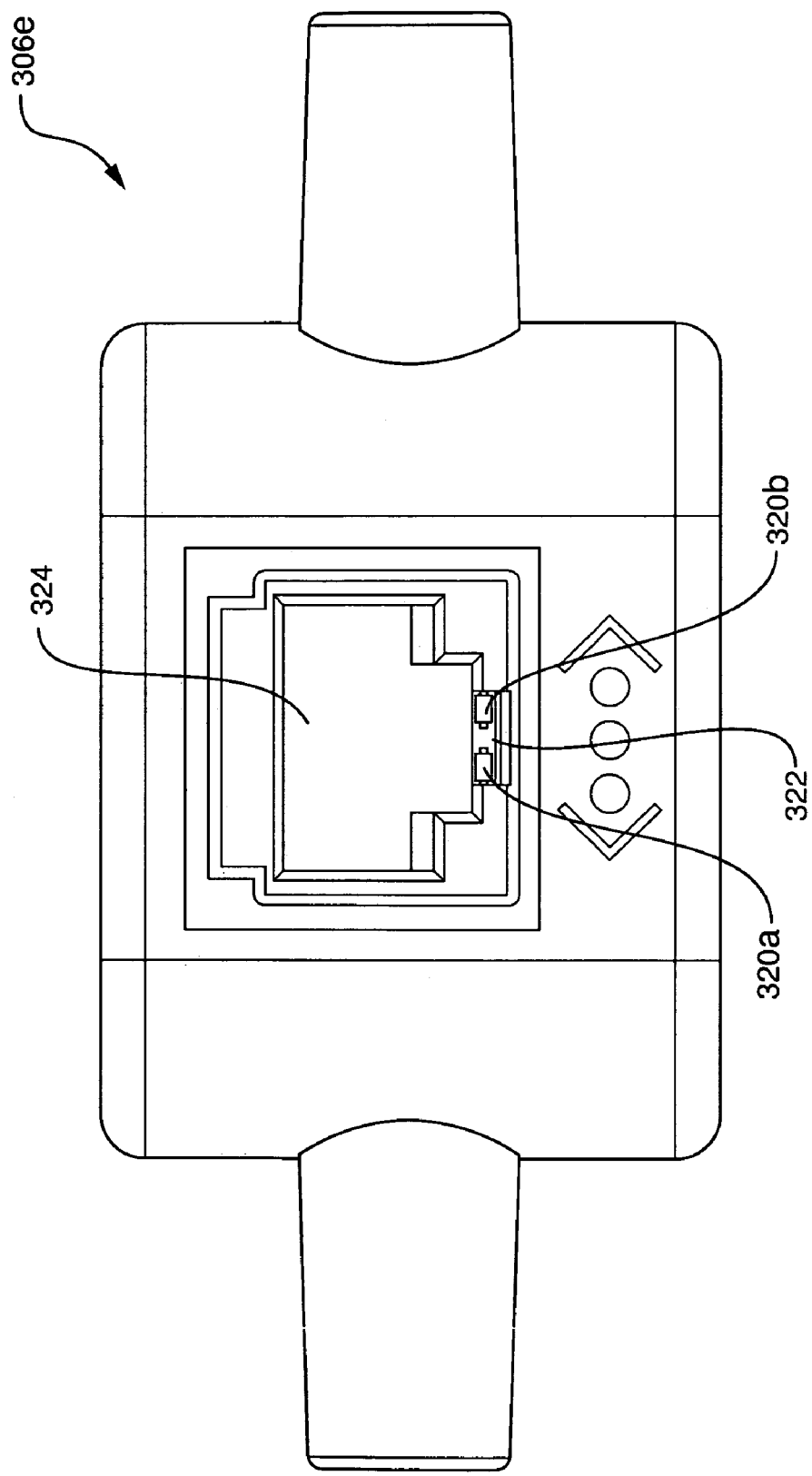
FIG. 3D is a front view of an Ethernet connector of the cable of FIGS. 3A-3C according to one embodiment of the present invention.

A conventional Ethernet connector has a set of external colored status indicator lights. In contrast, as shown more clearly in FIG. 3D, the Ethernet connector 306e includes a set of internal status indicator LEDs 320a-b at the bottom of the inside of the connector cavity 324. In the example shown in FIG. 3D, LED 320a is an orange LED and LED 320b is a yellow LED mounted on a printed circuit board 322. When male Ethernet connector 506e is plugged into female Ethernet connector 306e, male Ethernet connector 506 is adjacent to the internal LEDs 320a-b. Because the body of the male Ethernet connector 506 is translucent, the illuminated LED (either 320a or 320b) conditionally illuminates the body of the male Ethernet connector 506 with the corresponding color. The body of the male Ethernet connector 506, therefore, rather than the status LEDs 320a-b, provides the direct visual indication of the status of the Ethernet connection to the user. This both provides an aesthetically pleasing effect and allows the size and complexity of the Ethernet connector 306e to be reduced by eliminating the need to place LEDs on the outside of the connector 306e.

VGA connector 306f is coupled to a monitor 506f. Note that in the example shown in FIG. 5B, the VGA connector 306f includes both a female VGA connector 504a and a male VGA connector 504b. The female and male connectors 504a-b are disposed orthogonally to each other on the connector 306f. The male connector 504b may be connected directly to the female connector (not shown) on the monitor 506f. Alternatively, if another VGA cable is already connected between the monitor 506f and another computing device (not shown), the (male) end of that VGA cable may be disconnected from the other computing device and connected to the female VGA connector on the cable 300. This facilitates switching the video source between the computing device 500 and other computing devices without the need to detach an existing VGA cable from the monitor 506f.

Note that this kind of orthogonal arrangement of female and male connectors may be used with other kinds of connectors, such as serial connectors.

FIG. 5C shows an example of a configuration in which the cable 300 is coupled to the computing device 500 and the monitor 506f. Keyboard and mouse 506c communicate wirelessly with the computing device 500 using BlueTooth® technology.

Advantages of various embodiments of the present invention include, but are not limited to, the following. Cables implemented in accordance with embodiments of the present invention may be implemented using a small amount of cable, and may therefore be easy to carry. The cable may also be easy to fold, store, and carry in a small amount of space because the connectors may be coupled to each other using flexible cable segments. Embodiments of the present invention, such as those illustrated in FIGS. 1E-1F, may be topologically simple, visually appealing, and less prone to tangling than prior art cables. Such features provide embodiments of the present invention and systems incorporating same with a degree of elegance and ease-of-use.

Embodiments of the present invention may provide connectors which are positionally appropriate. For example, connectors for devices which typically are located furthest away from the computing device may be located at the furthest ends of the cable. Embodiments of the present invention may provide connectors that are positionally distributed even while topologically simple. For instance, cables such as 100e concentrate peripheral cables that attach to module 116, potentially creating congestion at module 116, whereas cable 100f, which is as topologically simple as cable 100e, permits the peripheral cables to attach as connectors 132a, 132b, and 132c, which may be comfortably distant from each other.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The particular cables and connectors disclosed herein are provided merely as examples. Cables implemented in accordance with embodiments of the present invention may include any number and type of connectors in any combination. Although the cables shown in the drawings include exactly one of each of a plurality of types of connectors, this is not a requirement of the present invention. For example, a single cable may include multiple connectors of the same type (e.g., USB). Furthermore, cables implemented in accordance with embodiments of the present invention may connect computing devices to peripheral devices, computing devices to computing devices, peripheral devices to peripheral devices, or any combination thereof.

Cable segments (such as cable segments 124a-b) may have any length. Short segments, for example, may be desirable to make a cable easier to store/transport, while longer segments may be desirable to make the cable easier to connect to multiple devices that are far away from each other. The cable and/or segments of it may be retractable to enable their lengths to vary. Features of the cable types shown in FIGS. 1E and 1F may be combined with each other to produce hybrid cables.

The primary connector (e.g., connector 120a in FIG. 1E or connector 128a in FIG. 1F) carries a plurality of signals.

For example, assume for purposes of illustration that the connector 132a in FIG. 1F is an audio connector, that the connector 132b is a video connector, and that the connector 132c is a power connector. The initial portion of the primary cable segment (between primary connector 128a and secondary connector 132a) may include wires carrying all three of the audio signal, video signal, and power signal. The audio signal, however, may be terminated at the audio connector 132a. As a result, only the wires carrying the video and power signals may be included in the portion of the primary cable segment 130 between connector 132a and connector 132b. Similarly, the video signal may be terminated at the video connector 132b. As a result, only the wires carrying the power signal may be included in the portion of the primary cable segment 130 between connector 132b and connector 132c. Therefore, the cable 100f may be made successively narrower, thereby allowing the cable 100f to be made smaller and potentially less costly to manufacture. A similar approach may be applied to a cable of the type shown in FIG. 1E.

It may, however, be desirable to maintain a constant cable width. For example, a constant-width cable may be desirable for reasons of aesthetics or manufacturing simplicity. In such cases, the same number of wires may be maintained throughout the cable to maintain cable thickness. Alternatively, a constant cable thickness (i.e., cross-sectional area) may be maintained by using filler material after particular wires have been terminated.

What is claimed is:

1. A cable comprising:
    a first connector of a first type, the first connector comprising a female output connector, a male output connector disposed orthogonally to the female connector, and a housing including the female connector and the male connector;
    a second connector of a second type that differs from the first type;
    a primary flexible cable segment coupled to the first connector at a first location on the primary flexible cable segment and to the second connector at a second location on the primary flexible cable segment; and
    a third connector coupled to the primary flexible cable segment at a third location between the first and second locations on the primary flexible cable segment.

2. The cable of claim 1, wherein the first location is a proximate end of the primary flexible cable segment, wherein the second location is a distal end of the primary flexible cable segment, and wherein the third location is a location between the proximate and distal ends of the primary flexible cable segment.

3. The cable of claim 1, wherein each of the first and second types is one of a Universal Serial Bus, IEEE 1394, video, audio, and power connector type.

4. The cable of claim 1, further comprising:
    a first secondary flexible cable segment coupled between the third connector and the third location on the primary flexible cable segment.

5. The cable of claim 1, wherein the second connector is affixed to the primary flexible cable segment at the second location on the primary flexible cable segment, and wherein the third connector is affixed to the primary flexible cable segment at the third location on the primary flexible cable segment.

6. The cable of claim 1, wherein the first type is a video connector type and wherein the second type is a power connector type.

7. The cable of claim 1, further comprising:
at least one additional connector coupled to the primary flexible cable segment at at least one additional location between the second location and the third location on the primary flexible cable segment.

8. The cable of claim 7, further comprising:
a first secondary flexible cable segment coupled between the third connector and the third location on the primary flexible cable segment; and
a second secondary flexible cable segment coupled between the at least one additional connector and the at least one additional location on the primary flexible cable segment.

9. The cable of claim 7, wherein the at least one additional connector is affixed to the primary flexible cable segment at the at least one additional location.

10. The cable of claim 1, wherein the primary flexible cable segment comprises:
first signal transmission means for transmitting a first signal from the first connector to the second connector; and
second signal transmission means for transmitting a second signal from the first connector to the third connector.

11. The cable of claim 10, wherein each of the first and second signals is one of a Universal Serial Bus, IEEE 1394, video, audio, and power signal.

12. The cable of claim 10, wherein the first and second signals are of different types.

13. The cable of claim 10, wherein the second signal transmission means does not include means for transmitting the second signal to the second connector.

14. The cable of claim 13, wherein the first signal transmission means does not include means for transmitting the first signal to the third connector.

15. The cable of claim 1, wherein at least one of the second and third connectors includes means for converting a signal received at the at least one of the second and third connectors from a first protocol to a second protocol.

16. The cable of claim 15, wherein the means for converting comprises means for converting the signal from a Universal Serial Bus signal to an Ethernet signal.

* * * * *